United States Patent
Huang et al.

(10) Patent No.: US 9,648,985 B2
(45) Date of Patent: May 16, 2017

(54) GRILL DEVICE

(71) Applicant: Tsann Kuen (Zhangzhou) Enterprise Co., Ltd., Fujian (CN)

(72) Inventors: Zhenshan Huang, Fujian (CN); Hanming Wu, Fujian (CN); Chuntian Qiu, Fujian (CN)

(73) Assignee: Tsann Kuen (Zhangzhou) Enterprise Co., Ltd., Fujian (CN)

( * ) Notice: Subject to any disclaimer, the term of this patent is extended or adjusted under 35 U.S.C. 154(b) by 0 days.

(21) Appl. No.: 14/701,887

(22) Filed: May 1, 2015

(65) Prior Publication Data
US 2015/0320258 A1 Nov. 12, 2015

(51) Int. Cl.
*A47J 27/62* (2006.01)
*A47J 37/06* (2006.01)
*A47J 37/10* (2006.01)
*H05B 3/06* (2006.01)
*A47J 36/24* (2006.01)
*A47J 36/32* (2006.01)

(52) U.S. Cl.
CPC ....... *A47J 37/0611* (2013.01); *A47J 36/2483* (2013.01); *A47J 36/32* (2013.01)

(58) Field of Classification Search
CPC .... A47J 37/06; A47J 37/0611; A47J 36/2483; A47J 36/32
USPC ......... 99/331, 372, 374–377, 380, 422, 424, 99/425; 219/524, 525
See application file for complete search history.

(56) References Cited

U.S. PATENT DOCUMENTS

| | | | | |
|---|---|---|---|---|
| 2,059,133 A | * | 10/1936 | Merritt | A47J 37/0623 126/41 R |
| 4,987,827 A | * | 1/1991 | Marquez | A47J 37/0611 99/331 |
| 5,606,905 A | * | 3/1997 | Boehm | A47J 37/0611 126/369 |
| 6,016,741 A | * | 1/2000 | Tsai | A47J 37/0611 99/341 |
| 6,116,150 A | * | 9/2000 | Greenfield, Jr. | A47J 37/08 219/492 |
| 6,389,959 B1 | * | 5/2002 | Robertson | A47J 37/0611 219/386 |
| 7,658,143 B2 | * | 2/2010 | Cretors | A47J 37/048 99/331 |
| 9,192,178 B2 | * | 11/2015 | Berge | A47J 37/0676 |

(Continued)

*Primary Examiner* — Dana Ross
*Assistant Examiner* — Lindsey C Staubach
(74) *Attorney, Agent, or Firm* — Muncy, Geissler, Olds & Lowe, P.C.

(57) ABSTRACT

A grill device includes pivotally connected lower and upper grilling units, an auxiliary grilling unit, and main and auxiliary controllers. Each of the lower and upper grilling units and the auxiliary grilling unit includes a grilling plate and a heater module for heating the grilling plate. The main controller is for sensing temperatures of the grilling plates of the lower and upper grilling units, and disables the heater modules thereof when the temperature is greater than a first predetermined temperature. The auxiliary controller is for sensing a temperature of the grilling plate of the auxiliary grilling unit, and disables the heater module thereof when the temperature is greater than a second predetermined temperature lower than the first predetermined temperature.

4 Claims, 7 Drawing Sheets

(56) References Cited

U.S. PATENT DOCUMENTS

2010/0107892 A1* 5/2010 Yeh ...................... A47J 37/0611
99/333

* cited by examiner

FIG.7

GRILL DEVICE

CROSS-REFERENCE TO RELATED APPLICATION

This application claims priority to Chinese Application No. 201410190173.4, filed on May 6, 2014.

BACKGROUND OF THE INVENTION

1. Field of the Invention

This invention relates to a cooking device, more particularly to a grill device.

2. Description of the Related Art

A conventional grill device usually includes pivotally-connected upper and lower grilling plates, and upper and lower main heater modules for respectively heating the upper and lower grilling plates so as to cook food disposed between the upper and lower grilling plates. Additionally, a heat conductive tray is disposed on and in contact with the upper grilling plate for holding food and for keeping the food warm by heat conducted from the upper grilling plate.

However, the temperature of the tray is dependent on the upper grilling plate and cannot be controlled independently.

SUMMARY OF THE INVENTION

Therefore, the object of the present invention is to provide a grill device having an auxiliary grilling plate that can be heated independently.

According to this invention, a grill device includes a lower grilling unit, an upper grilling unit, an auxiliary grilling unit, a main controller and an auxiliary controller. The lower grilling unit includes a lower grilling plate having opposite up-confronting surface and down-confronting surface and a lower main heater module disposed adjacent to the down-confronting surface of the lower grilling plate for heating the lower grilling plate. The upper grilling unit is pivotally connected to the lower grilling unit and includes an upper grilling plate having opposite up-confronting surface and down-confronting surface, and an upper main heater module disposed adjacent to the up-confronting surface of the upper grilling plate. The auxiliary grilling unit is mounted adjacent to the upper grilling unit, and includes an auxiliary grilling plate and an auxiliary heater module disposed adjacent to the auxiliary grilling plate for heating the auxiliary grilling plate. The main controller is for sensing temperatures of the lower and upper grilling plates, and is operable to disable the lower and upper main heater modules when the temperature of the lower and upper grilling plates is greater than a first predetermined temperature. The auxiliary controller is for sensing a temperature of the auxiliary grilling plate, and is operable to disable the auxiliary heater module when the temperature of the auxiliary grilling plate is greater than a second predetermined temperature that is lower than the first predetermined temperature.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Before the present invention is described in greater detail, it should be noted that like reference numerals are used to indicate corresponding or analogous elements throughout the accompanying disclosure.

Figure 1:
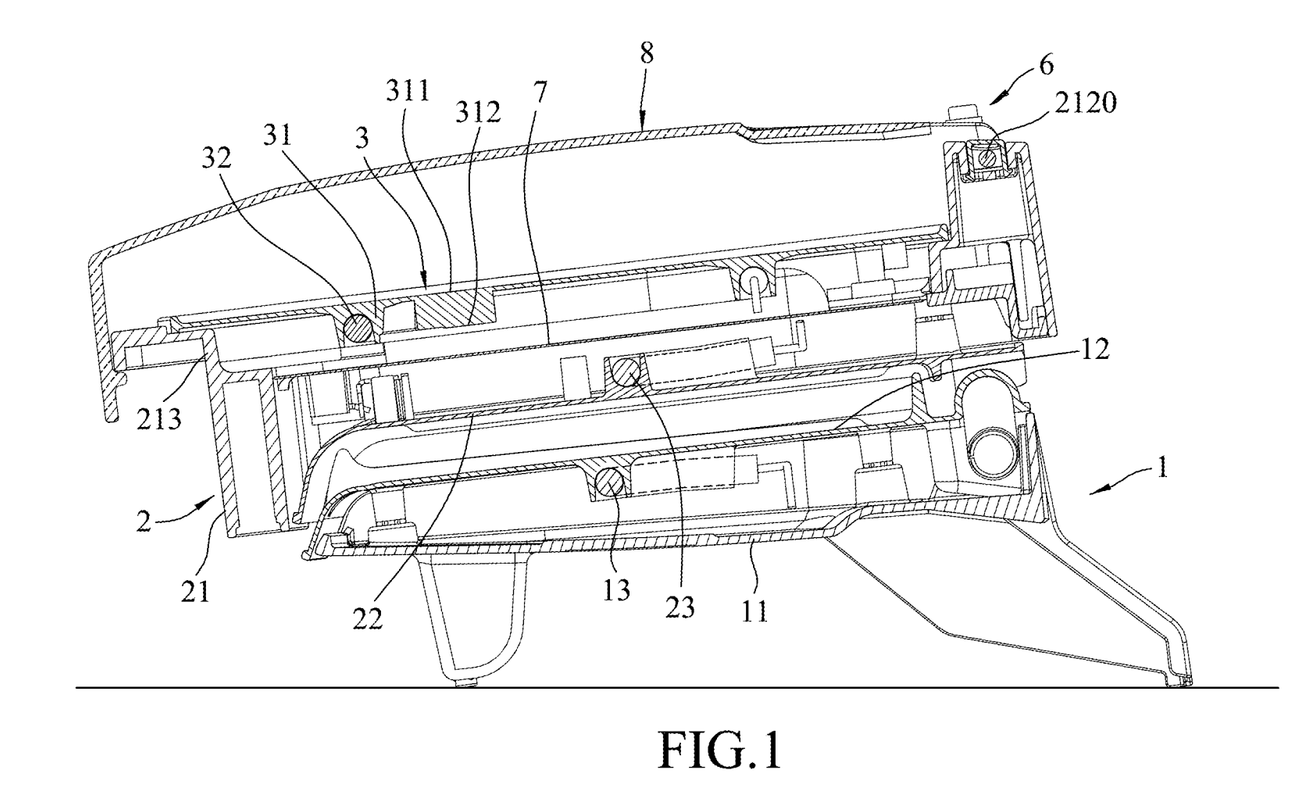
FIG. 1 is a schematic sectional view of a first preferred embodiment of a grill device according to the present invention.
Figure 2:
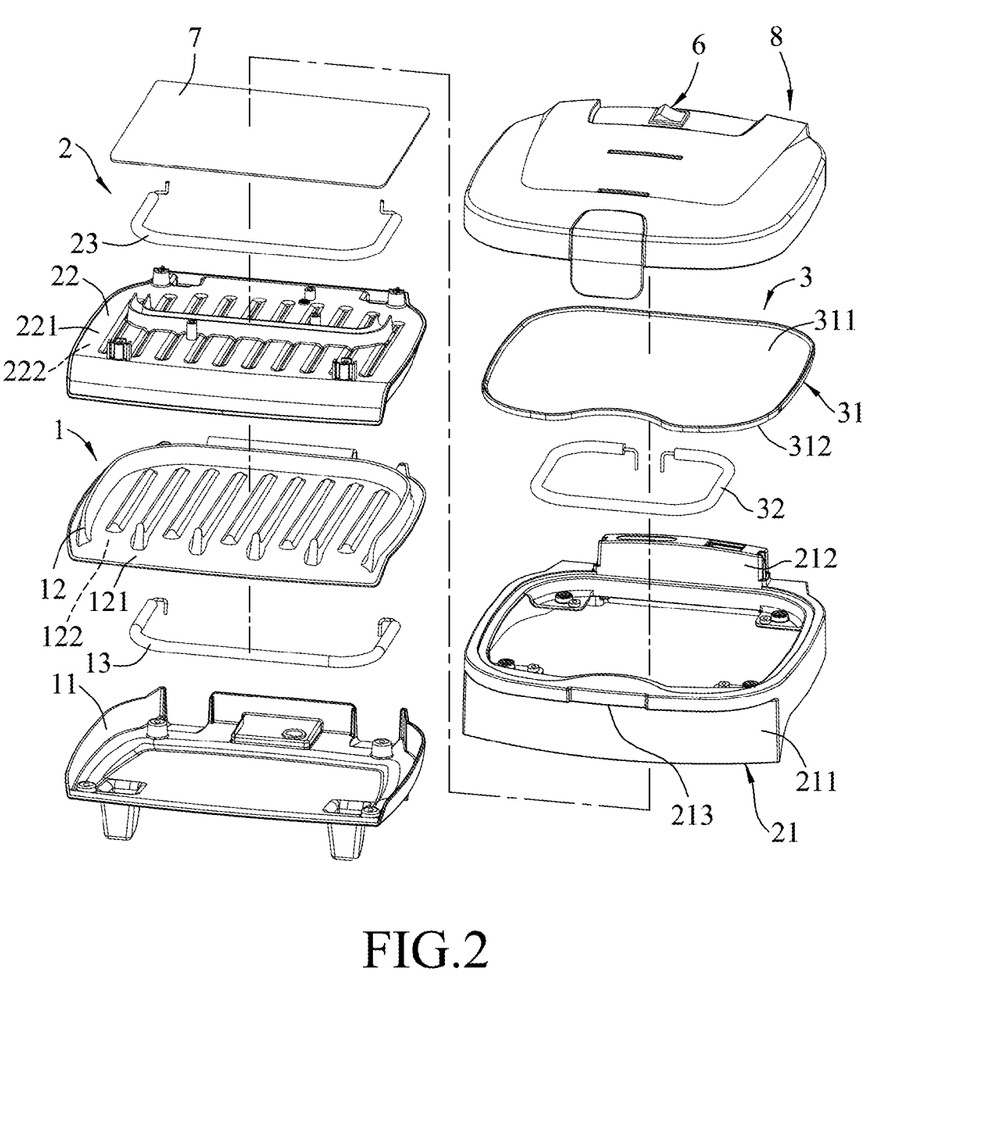
FIG. 2 is an exploded perspective view of the first preferred embodiment.
Figure 3:
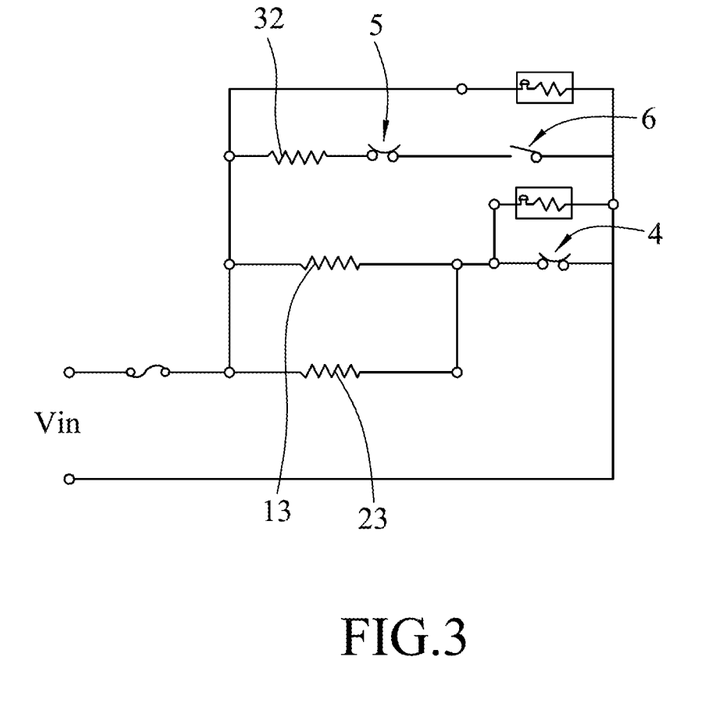
FIG. 3 is an equivalent-circuit diagram of the grill device.

Referring to FIGS. 1 to 3, the first preferred embodiment of the grill device according to the present invention includes a lower grilling unit 1, an upper grilling unit 2, an auxiliary grilling unit 3, a main controller 4, an auxiliary controller 5, a switch 6, an insulating plate 7 and a protective cover 8.

The lower grilling unit 1 includes a lower mounting seat 11, a lower grilling plate 12, and a lower main heater module 13. The lower grilling plate 12 is mounted on the lower mounting seat 11, and has opposite up-confronting surface 121 and down-confronting surface 122. The lower main heater module 13 is disposed under and is attached to the down-confronting surface 122 of the lower grilling plate 12 for heating the lower grilling plate 12.

The upper grilling unit 2 is pivotally connected to the lower grilling unit 1, and includes an upper mounting seat 21, an upper grilling plate 22 and an upper main heater module 23. The upper mounting seat 21 includes a surrounding wall 211, to which the upper grilling plate 22 is mounted, and an extension wall 212. The extension wall 212 extends from one side edge of the surrounding wall 211 away from the upper grilling plate 22. The protective cover 8 is pivotally connected to the extension wall 212 via a pin 2120, and is operable to cover and uncover the auxiliary grilling unit 3.

The surrounding wall 211 includes an operable portion 213. The operable portion 213 is disposed opposite to the extension wall 212, and is accessible to a user to permit lifting of the upper mounting seat 21 and the upper grilling plate 22 relative to the lower grilling unit 1. The upper grilling plate 22 has opposite up-confronting surface 221 and down-confronting surface 222. The upper main heater module 23 is disposed above and is attached to the up-confronting surface 221 of the upper grilling plate 22 for heating the upper grilling plate 22.

The auxiliary grilling unit 3 is mounted above the upper grilling unit 2, and includes an auxiliary grilling plate 31 and an auxiliary heater module 32. The auxiliary grilling plate 31 has opposite up-confronting surface 311 and down-confronting surface 312. The auxiliary heater module 32 is disposed under and is attached to the down-confronting surface 312 of the auxiliary grilling plate 31 for heating the auxiliary grilling plate 31, and is disposed above and spaced apart from the upper main heater module 23. The insulating plate 7 is disposed between the upper main heater module 23 and the auxiliary heater module 32 so as to reduce influence of heat generated by the upper main heater module 23 and the auxiliary heater module 32 on the auxiliary grilling plate 31 and the upper grilling plate 21, respectively. In this embodiment, the lower main heater module 13, the upper main heater module 23 and the auxiliary heater module 32 are implemented using electric heating tubes.

It should be noted that the protective cover 8 is spaced apart from the up-confronting surface 311 of the auxiliary grilling plate 31 when covering the auxiliary grilling plate 31 so as to define a space therebetween for accommodating food that is placed on the auxiliary grilling plate 31.

The main controller 4 is electrically connected to the lower and upper grilling units 1, 2 for sensing temperatures of the lower and upper grilling plates 12, 22, and is operable to disable the lower and upper main heater modules 13, 23 when the temperature of the lower and upper grilling plates 12, 22 is greater than a first predetermined temperature, and to enable the lower and upper main heater modules 13, 23 when the temperature of the lower and upper grilling plates 12, 22 is lower than the first predetermined temperature.

The auxiliary controller 5 is electrically connected to the auxiliary grilling unit 3 for sensing a temperature of the auxiliary grilling plate 31, and is operable to disable the auxiliary heater module 32 when the temperature of the auxiliary grilling plate 31 is greater than a second predetermined temperature that is lower than the first predetermined temperature, and to enable the auxiliary heater module 32 when the temperature of the auxiliary grilling plate 31 is lower than the second predetermined temperature. For example, each of the main controller 4 and the auxiliary controller 5 may be a thermostat.

The switch 6 is disposed on the protective cover 8, is electrically connected to the auxiliary heater module 32, and is operable to start or stop electricity flow to the auxiliary heater module 32. Note that another switch (not shown) which is operable to start or stop electricity flow to the lower main heater module 13 and the upper main heater module 23 may be provided.

Figure 4:
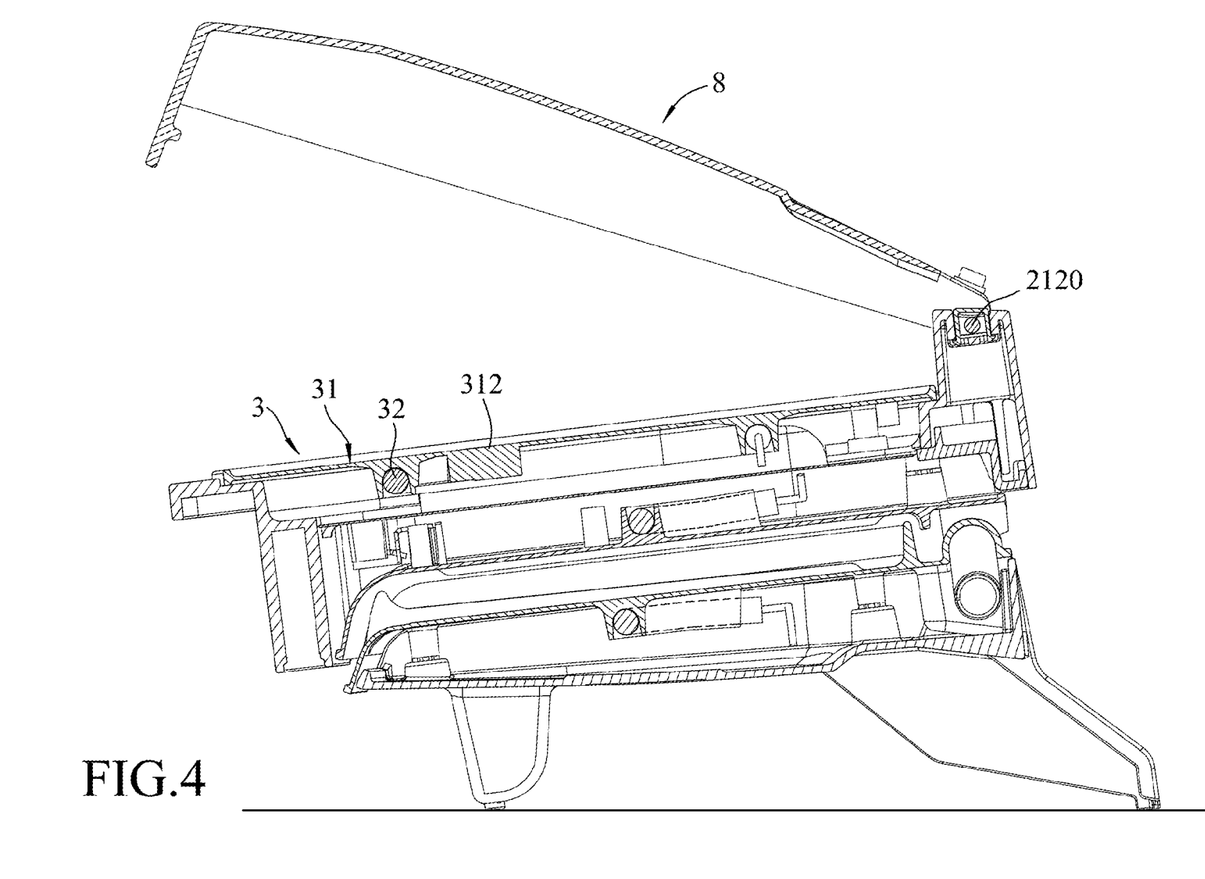
FIG. 4 is a schematic sectional view of the grill device, illustrating a cover of the grill device being opened.
Figure 5:
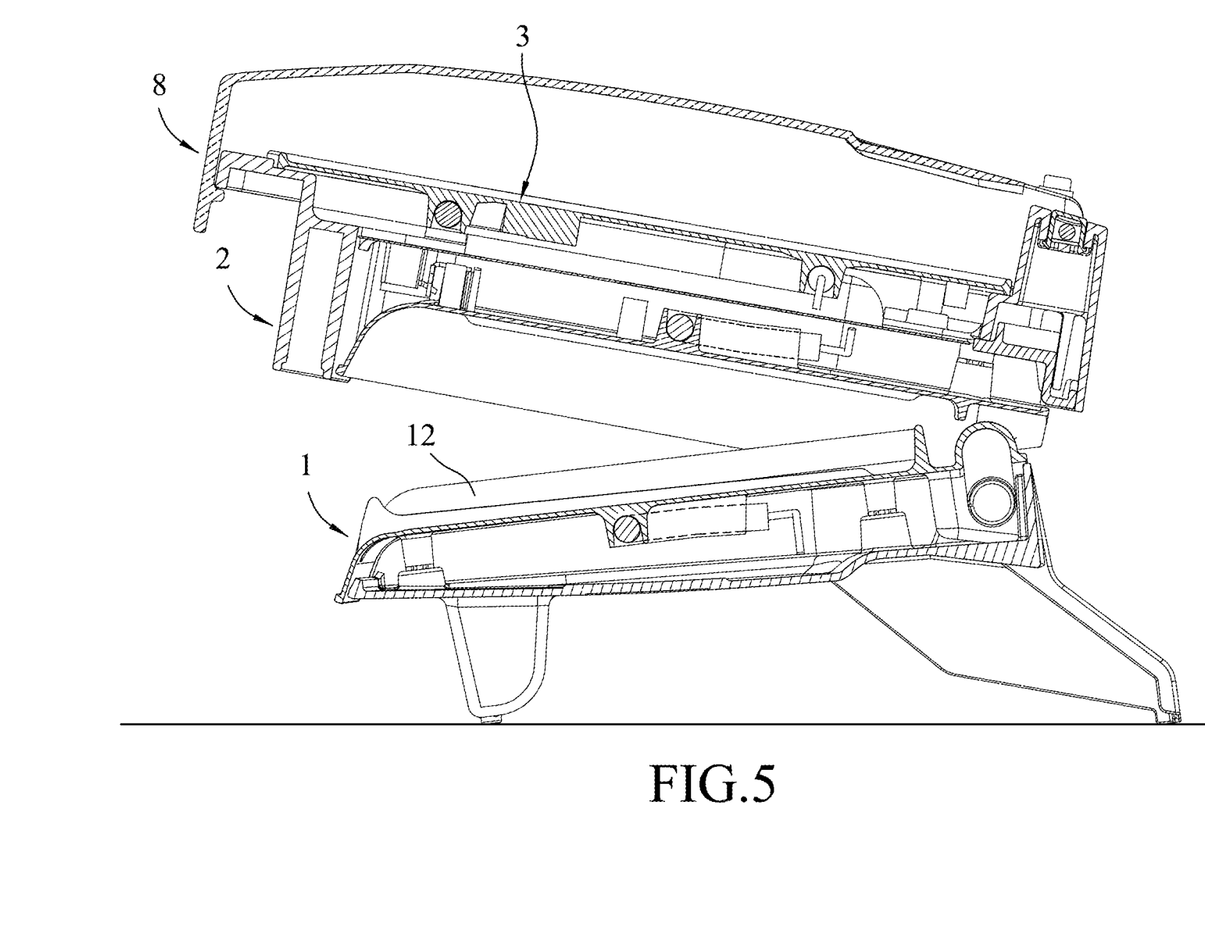
FIG. 5 is a schematic sectional view of the grill device, illustrating an upper grilling unit of the grill device being opened.

As shown in FIG. 5, when it is desired to cook food such as steak at a relatively high temperature, the protective cover 8, the auxiliary grilling unit 3 and the upper grilling unit 2 are rotated relative to the lower grilling unit 1 to expose the lower grilling plate 11 and then the steak is disposed between the lower and upper grilling plates 12, 22 for subsequent cooking. Turning to FIG. 4, when other food (such as bread) is to be cooked or kept at a temperature lower than that for cooking the steak, the protective cover 8 is rotated relative to the upper grilling plate 22 to uncover the auxiliary grilling plate 31, and food to be cooked is then disposed on the up-confronting surface 311 of the auxiliary grilling plate 31.

It should be noted that the insulating plate 7 may alleviate heat generated by one of the upper main heater module 23 and the auxiliary heater module 32 to dissipate toward the other one of the upper main heater module 23 and the auxiliary heater module 32.

Figure 6:
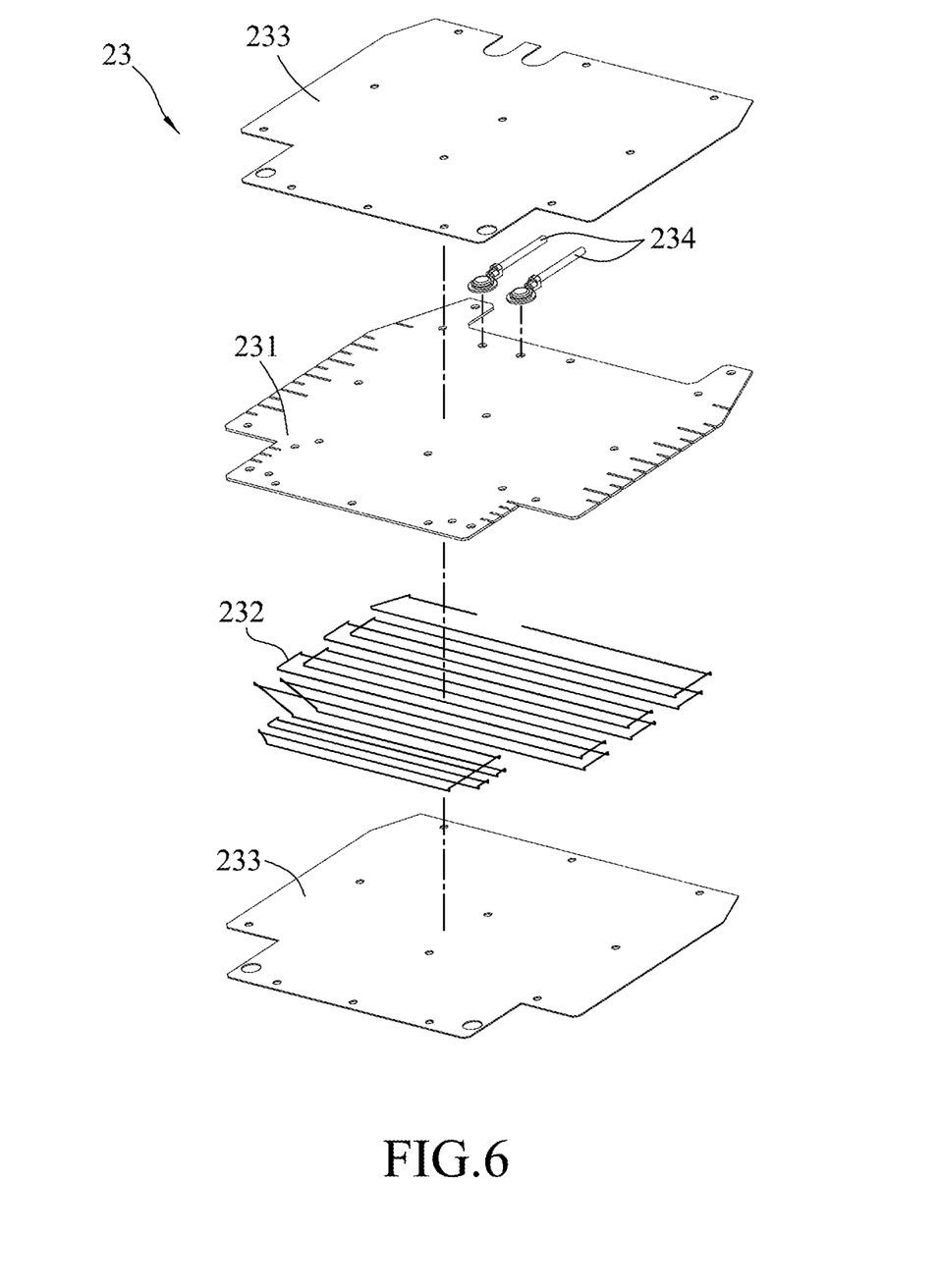
FIG. 6 is a schematic exploded perspective view of a main heater module of the grill device of a second preferred embodiment according to the present invention.
Figure 7:
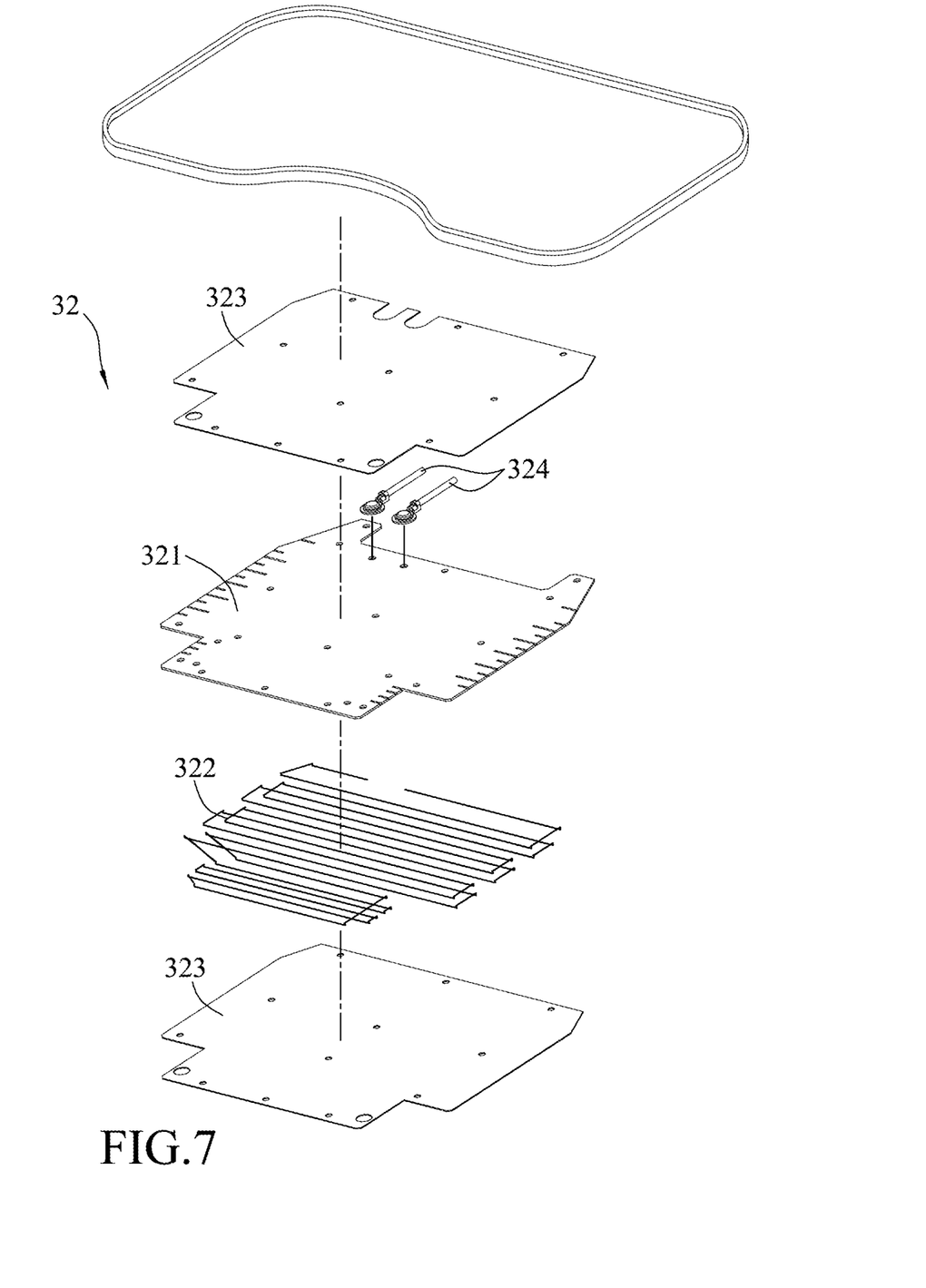
FIG. 7 is an exploded perspective view of an auxiliary heater module of the grill device of the second preferred embodiment.

Referring to FIGS. 6 and 7, a second preferred embodiment of the grill device of the present invention is shown. The main difference between the second embodiment and the first embodiment resides in configurations of the upper main heater module 23 and the auxiliary heater module 32. Specifically, the upper main heater module 23 includes an insulating substrate 231, a heating wire 232, a pair of electrodes 234 and two electrical insulating plates 233. The heating wire 232 is wound on the insulating substrate 231, and is electrically connected to the electrodes 224 for receiving electricity therefrom. The insulating plates 233 sandwich the insulating substrate 231 therebetween, and are connected to the insulating substrate 231.

Similarly, the auxiliary heater module 32 includes an insulating substrate 321, a heating wire 322, a pair of electrodes 324 and two electrical insulating plates 323. The heating wire 322 is wound on the insulating substrate 321, and is electrically connected to the electrodes 324 for receiving electricity therefrom. The insulating plates 323 sandwich the insulating substrate 321 therebetween, and are connected to the insulating substrate 321. Note that the insulating plates 233, 323 may be made of mica that has a relatively good insulation performance and that can be processed to have a relatively thin thickness.

To sum up, the advantages of the grill device of the present invention are as follows. In the present invention, the auxiliary grilling plate 31 can be independently heated by the auxiliary heater module 32, such that the food disposed on the auxiliary grilling plate 31 may be maintained at a desired temperature or cooked at a temperature lower than that of the lower and upper grilling plates 12, 22. By this way, different kinds of food may be cooked using the grill device and the utility of the grill device is enhanced.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. A grill device comprising:
    a lower grilling unit including a lower grilling plate that has opposite up-confronting surface and down-confronting surface and a lower main heater module that is disposed adjacent to said down-confronting surface of said lower grilling plate for heating said lower grilling plate;
    an upper grilling unit pivotally connected to said lower grilling unit and including an upper grilling plate that has opposite up-confronting surface and down-confronting surface, and an upper main heater module that is disposed adjacent to said up-confronting surface of said upper grilling plate;
    an auxiliary grilling unit mounted adjacent to said upper grilling unit, and including an auxiliary grilling plate and an auxiliary heater module that is disposed adjacent to said auxiliary grilling plate for heating said auxiliary grilling plate, said auxiliary heater module being an electric heating tube;
    a main controller for sensing temperatures of said lower and upper grilling plates, and controlling said lower and upper main heater modules to be maintained below a first predetermined temperature when the temperature of said lower and upper grilling plates is greater than the first predetermined temperature;
    an auxiliary controller for sensing a temperature of said auxiliary grilling plate, and controlling said auxiliary heater module to be maintained below a second predetermined temperature that is lower than the first predetermined temperature when the temperature of said auxiliary grilling plate is greater than the second predetermined temperature that is lower than the first predetermined temperature; and
    a switch configured to perform one of start and stop electricity flow to said auxiliary heater module.

2. The grill device as claimed in claim 1, wherein said auxiliary heater module is disposed over and spaced apart from said upper main heater module, said grill device further comprising a heat insulating plate disposed between said upper main heater module and said auxiliary heater module.

3. The grill device as claimed in claim 1, wherein said auxiliary heater module includes an insulating substrate, a heating wire winding on said insulating substrate, and two insulating plates sandwiching said insulating substrate therebetween.

4. The grill device as claimed in claim 1, wherein at least one of said upper and lower main heater modules includes an insulating substrate, a heating wire winding on said insulating substrate, and two insulating plates sandwiching said insulating substrate therebetween.

* * * * *